(12) United States Patent
Strebel et al.

(10) Patent No.: US 10,607,474 B2
(45) Date of Patent: Mar. 31, 2020

(54) FACILITY SAFETY SYSTEM

(71) Applicant: Federal Signal Corporation, Oak Brook, IL (US)

(72) Inventors: David Louis Strebel, Lake in the Hills, IL (US); Paul M. Gergets, Saint John, IN (US); Michael K. Pula, Naperville, IL (US); Justin Barth, Elgin, IL (US); Paul John Ferrara, Frankfort, IL (US); Albena Plamenova Iotova-Gagnaire, Elmhurst, IL (US); Jorge Manuel Jacinto Guerreiro, Oak Brook, IL (US)

(73) Assignee: Federal Signal Corporation, Oak Brook, IL (US)

( * ) Notice: Subject to any disclaimer, the term of this patent is extended or adjusted under 35 U.S.C. 154(b) by 0 days.

(21) Appl. No.: 16/261,712

(22) Filed: Jan. 30, 2019

(65) Prior Publication Data
US 2019/0236931 A1    Aug. 1, 2019

Related U.S. Application Data

(60) Provisional application No. 62/623,644, filed on Jan. 30, 2018.

(51) Int. Cl.
| | | |
|---|---|---|
| G08B 25/10 | (2006.01) | |
| G08B 7/06 | (2006.01) | |
| H04W 4/02 | (2018.01) | |
| H04B 1/3827 | (2015.01) | |
| G08B 21/22 | (2006.01) | |
| G08B 27/00 | (2006.01) | |
| A62B 3/00 | (2006.01) | |
| G02B 27/01 | (2006.01) | |

(52) U.S. Cl.
CPC .............. *G08B 25/10* (2013.01); *A62B 3/00* (2013.01); *G02B 27/017* (2013.01); *G08B 7/06* (2013.01); *G08B 21/22* (2013.01); *G08B 27/005* (2013.01); *H04B 1/385* (2013.01); *H04W 4/026* (2013.01); *G02B 2027/0178* (2013.01); *H04B 2001/3866* (2013.01)

(58) Field of Classification Search
CPC .......... G02B 2027/0178; G02B 27/017; G08B 21/02; G08B 19/00; G08B 25/10; G08B 5/36; G08B 21/18; G08B 25/016
See application file for complete search history.

(56) References Cited

U.S. PATENT DOCUMENTS

| | | | | |
|---|---|---|---|---|
| 9,467,795 B2 * | 10/2016 | Kreitzer | ................. | H04B 1/385 |
| 9,478,115 B2 * | 10/2016 | Hahn | ................... | G05B 19/409 |
| 9,547,970 B2 * | 1/2017 | Jobin | ..................... | G08B 21/02 |
| 9,633,538 B1 * | 4/2017 | Kozloski | ................ | G08B 21/02 |

(Continued)

OTHER PUBLICATIONS

International Search Report and Written Opinion in PCT/US2019/015648 dated Apr. 4, 2019, 17 pages.

(Continued)

*Primary Examiner* — Nam T Huynh
(74) *Attorney, Agent, or Firm* — Merchant & Gould P.C.

(57) ABSTRACT

A safety system can include: at least one wearable device configured to communicate with a central hub of a facility; and the central hub programmed to determine a location of the at least one wearable device within the facility, and to provide emergency instructions to the at least one wearable device based upon the location.

3 Claims, 8 Drawing Sheets

(56) References Cited

U.S. PATENT DOCUMENTS

| | | |
|---|---|---|
| 9,900,735 B2 | 2/2018 | Barron et al. |
| 2007/0213088 A1 | 9/2007 | Sink |
| 2017/0374436 A1 | 12/2017 | Awiszus et al. |
| 2018/0315297 A1 | 11/2018 | Pavlacka |

OTHER PUBLICATIONS

Iristick NV, Smart safety glasses, 2017, 2 pages.
Phillips, Jon, XOEye smartglasses could be the all-work, no-play wearable that people actually use, Apr. 9, 2014, 7 pages.
Pivothead, The Device—Pivothead Wearable Imaging, 2016, 9 pages.

* cited by examiner

| Intelligent Safety Glasses |||
|---|---|---|
| LEFT | RIGHT | MEANING |
|  |  | No Indication = Normal |
| ● | ● | Danger Ahead, Turn Around |
| ● | ○ | Danger Left, Go Right |
| ○ | ● | Danger Right, Go Left |
| ○ | ○ | Danger, Proceed Ahead |

FACILITY SAFETY SYSTEM

BACKGROUND

Visual and audible alerting is not always effective in alerting employees, guests and others who are unfamiliar with an environment of emergencies and providing guidance to safe areas (evacuation routes or shelter in place). Other workplace hazards include, but are not limited to, the inability to see or hear the approach of vehicular traffic (e.g., forklift trucks). Further, the mandated use of personal protection equipment (PPE), such as glasses or goggles, hardhats, and hearing protection, can limit the wearer's awareness of visual/audible cues that are installed around factories, warehouses, construction areas and buildings.

Often times, signage is displayed around the facility in graphic as well as written form (may include language translations) to warn against hazardous areas, conditions or map evacuation routes/exits. However, ambient noise (sometimes combined with PPE) can raise the noise floor and reduce the awareness of nearby risks. Visitors and temporary workers who are unfamiliar with unsafe areas or areas of heavy traffic and are more likely to put themselves into harm's way, especially in emergency evacuation situations such as fire, explosions, inclement weather, or active shooter scenarios.

For employees and/or visitors donning PPE gear, including protective eyewear, headwear and hearing protection, peripheral awareness of traditional visual and audible alerts may be diminished and often requires the 'buddy system' means of notification. This is often true of welders or those working in extremely loud areas of a factory. In cases where announcements are used to precede an emergency notification, that announcement is lost during the time when the employee may still be wearing the PPE. Hence, the general alarm coupled with an announcement to shelter in place may be misinterpreted to evacuate the premise.

SUMMARY

In one aspect, a safety system includes: at least one wearable device configured to communicate with a central hub of a facility; and the central hub programmed to determine a location of the at least one wearable device within the facility, and to provide emergency instructions to the at least one wearable device based upon the location.

In another aspect, a pair of safety glasses for a safety system includes: a frame; two lenses; and one or more logical components programmed to communicate with a central hub of a facility; wherein the central hub determines a location of the safety glasses within the facility and provides emergency instructions to the safety glasses based upon the location.

In yet another aspect, a pair of safety glasses for a safety system includes: a frame; two lenses, wherein each of the two lenses includes a light to indicate an alert situation; and one or more logical components programmed to communicate with a central hub of a facility; wherein the central hub determines a location of the safety glasses within the facility and provides emergency instructions to the safety glasses based upon the location; and wherein each light on the two lenses is illuminated to indicate the emergency instructions.

DETAILED DESCRIPTION

The present disclosure is directed towards safety systems in facilities, such as factories, construction sites, and the like. In examples described herein, one or more of safety hubs and/or nodes and/or safety wearable(s) provide visual, audible and/or vibration-based alerting to keep individuals (e.g., employees and visitors) safe.

Figure 1:
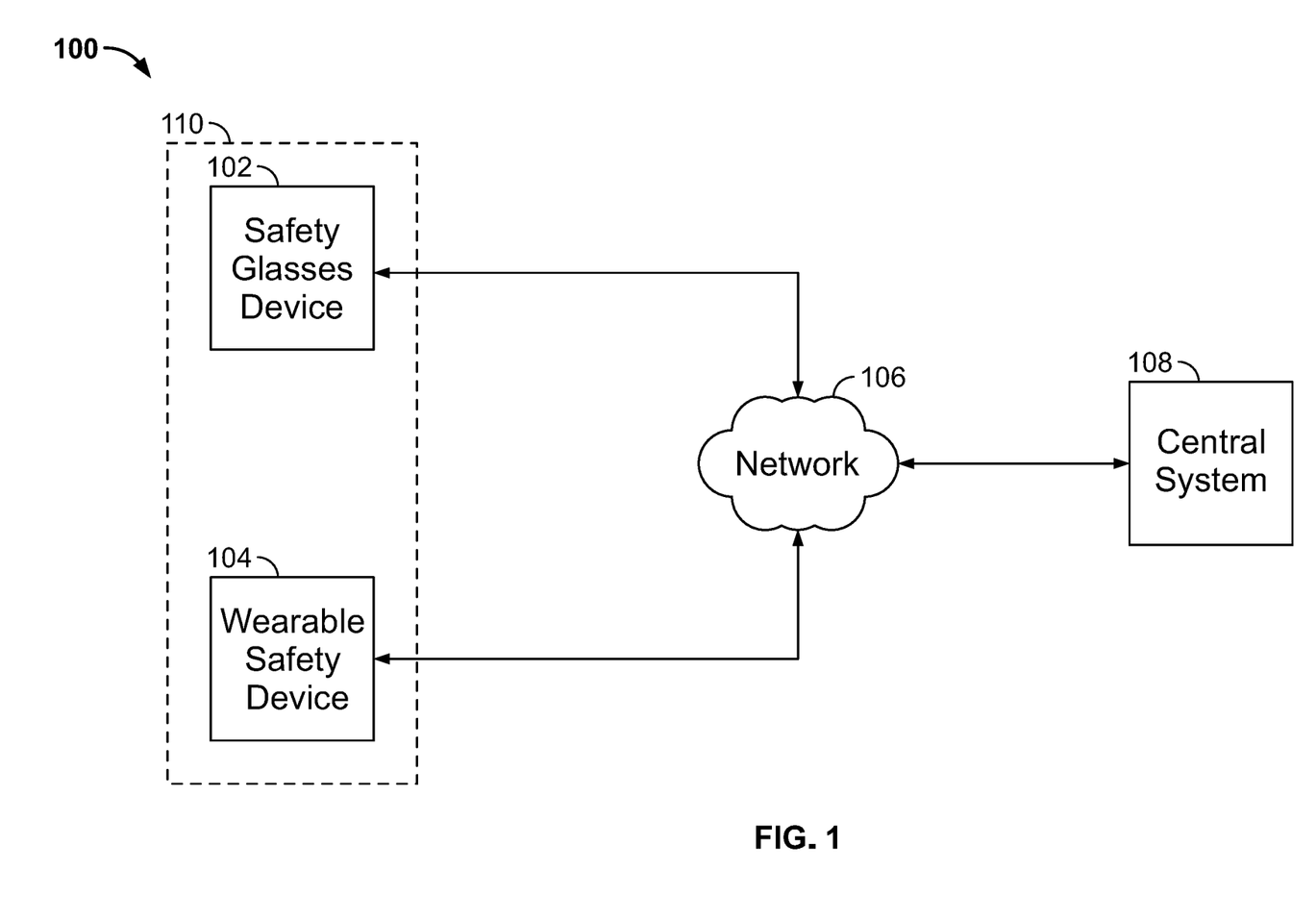
FIG. 1 illustrates an example safety system.

Referring now to FIG. 1, an example system 100 is provided, such as at a factory or construction site. In this system 100, an individual 110 (e.g., an employee or visitor) has one or more wearable devices, such as safety glasses device 102 and/or another wearable safety device 104 (see FIG. 2).

The safety glasses device 102 and/or the other wearable safety device 104 are configured to communicate through a network 106 to a central system 108. As described below, this central system 108 can include multiple nodes for the system 100. The central system 108 communicates with the safety glasses device 102 and/or the other wearable safety device 104 to provide safety information to the individual 110. In one example, the central system 108 can include functionality similar to that described in U.S. patent application Ser. No. 11/677,486 filed on Feb. 21, 2007, the entirety of which is hereby incorporated by reference.

In embodiments described herein, one or more of these safety devices can be provided to enhance safety within the system 100. In some embodiments, a single safety device (e.g., the safety glasses device 102) is provided. In other embodiments, multiple safety devices are used.

Figure 2:
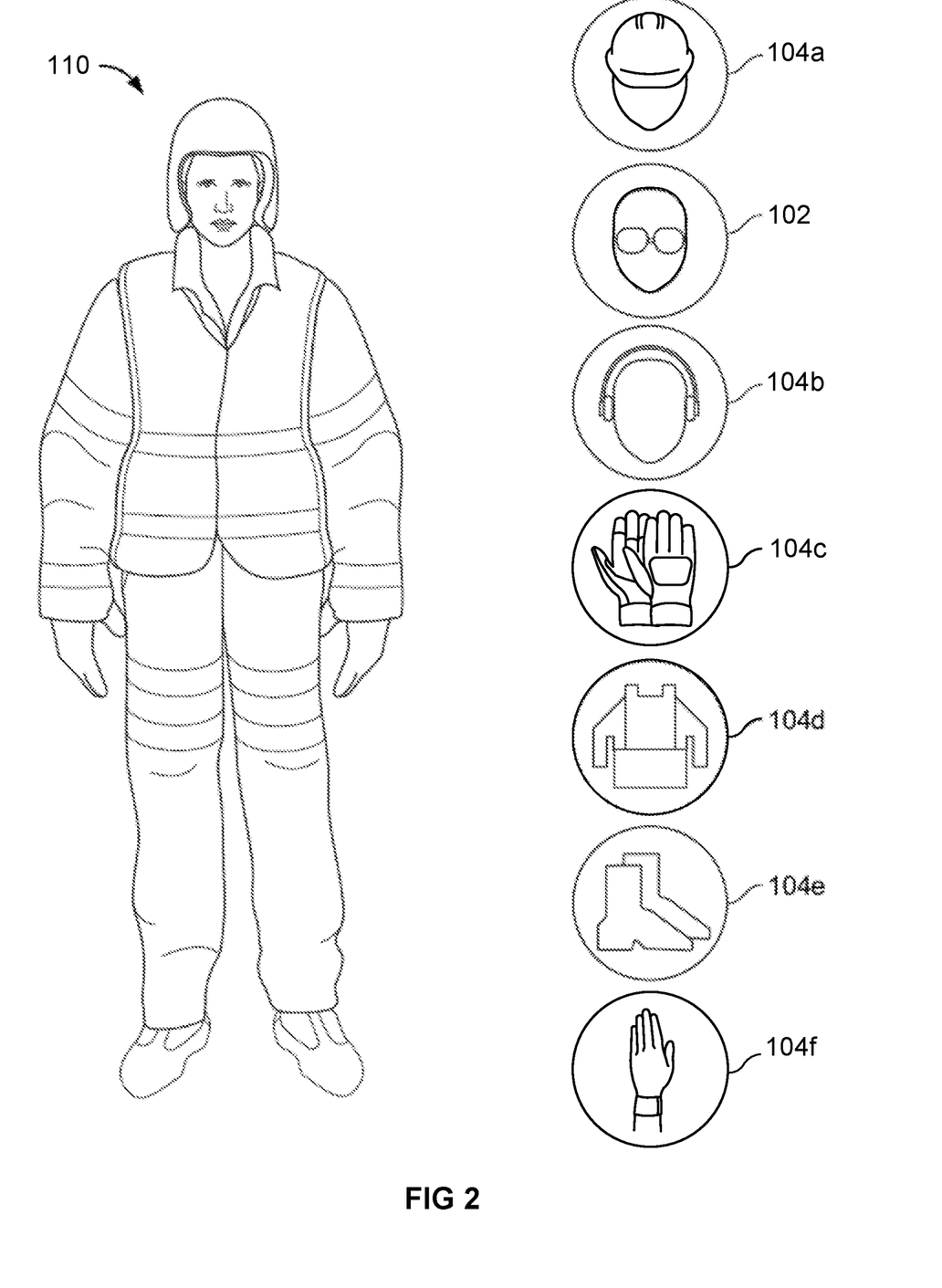
FIG. 2 illustrates an example individual including a plurality of safety devices of the safety system of FIG. 1.

Referring now to FIG. 2, the individual 110 is depicted wearing multiple wearable safety devices. In this example, the individual 110 is wearing the safety glasses device 102, along with other safety devices 104a-104e.

In the example shown, the safety glasses device 102 is eyewear that is rated to OSHA 1910.133(a)(b) recommendations, as well as complies with ANSI Z87.1 requirements for:

Impact vs. Non-Impact;
Splash and Dust Protection; and
Optical Radiation Protection.

These example safety glasses device 102 include a receiver (e.g., Wi-Fi, Bluetooth, cellular, radio or other) that interprets signals from an aggregated safety system using distributed signaling nodes throughout the facility to inform the wearer of emergencies or danger through visual displays on the lenses, vibration, and/or audio cues.

In the simplest interpretation of a design, the safety glasses device 102 may be impregnated with or have radially mounted red/green LEDs for stop/go alerting. Symbols may be added for additional capabilities and information based on cost model or stratification of product offering.

These safety glasses device 102 would be worn in replacement of traditional eyewear and be supplemental to the facility alerting/notification system. Additionally, when the notification system is augmented with active tracking of moving objects such as forklifts or other vehicles, an alert can be sent to the wearer who may be on a direct collision vector with the vehicle. Additional details regarding the safety glasses device 102 are provided below.

Referring still to FIG. 2, the individual can also wear one or more other safety devices. In this example, the functionality of the safety glasses device 102 could be integrated with traditional personal protective equipment (PPE) such as headgear/helmets 104*a*, hearing/ear protection 104*b* (example embodiments of hearing protection devices are provided in U.S. patent application Ser. No. 14/974,896 filed on Dec. 18, 2015, the entirety of which is hereby incorporated by reference), gloves 104*c*, safety vests 104*d*, footwear 104*e*, and/or wristbands/watches 104*f*. Other devices can also be used. Sensory feedback mechanisms for these articles of clothing may include, but not be limited to, vibration, audible, visual, and/or temperature. Non-PPE wearables may also be modified to provide intelligent notification to the wearer include belts, suspenders, watches, neckwear and identification badges/ID cards.

Figure 3:
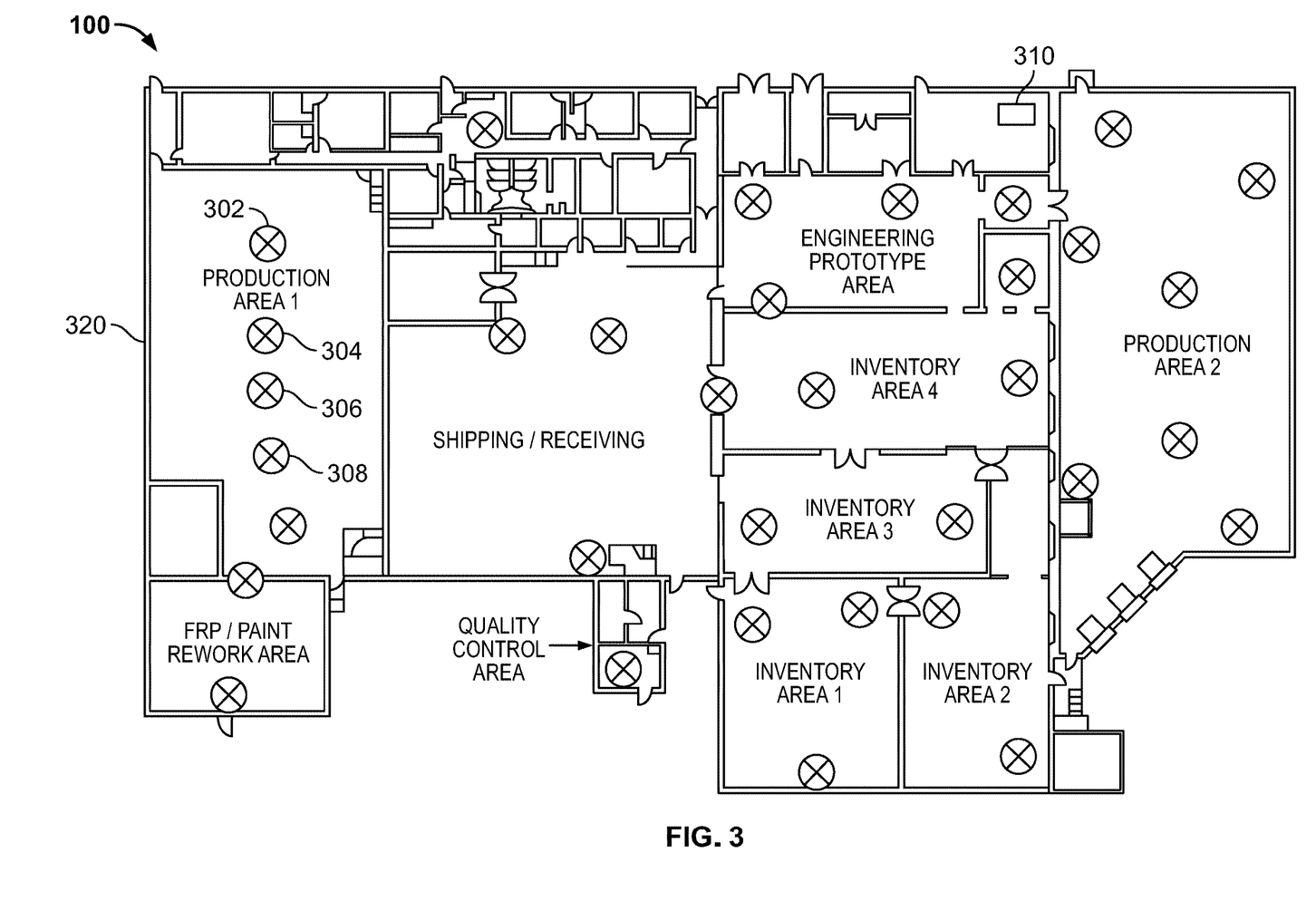
FIG. 3 illustrates an example facility floorplan of the safety system of FIG. 1.
Figure 4:
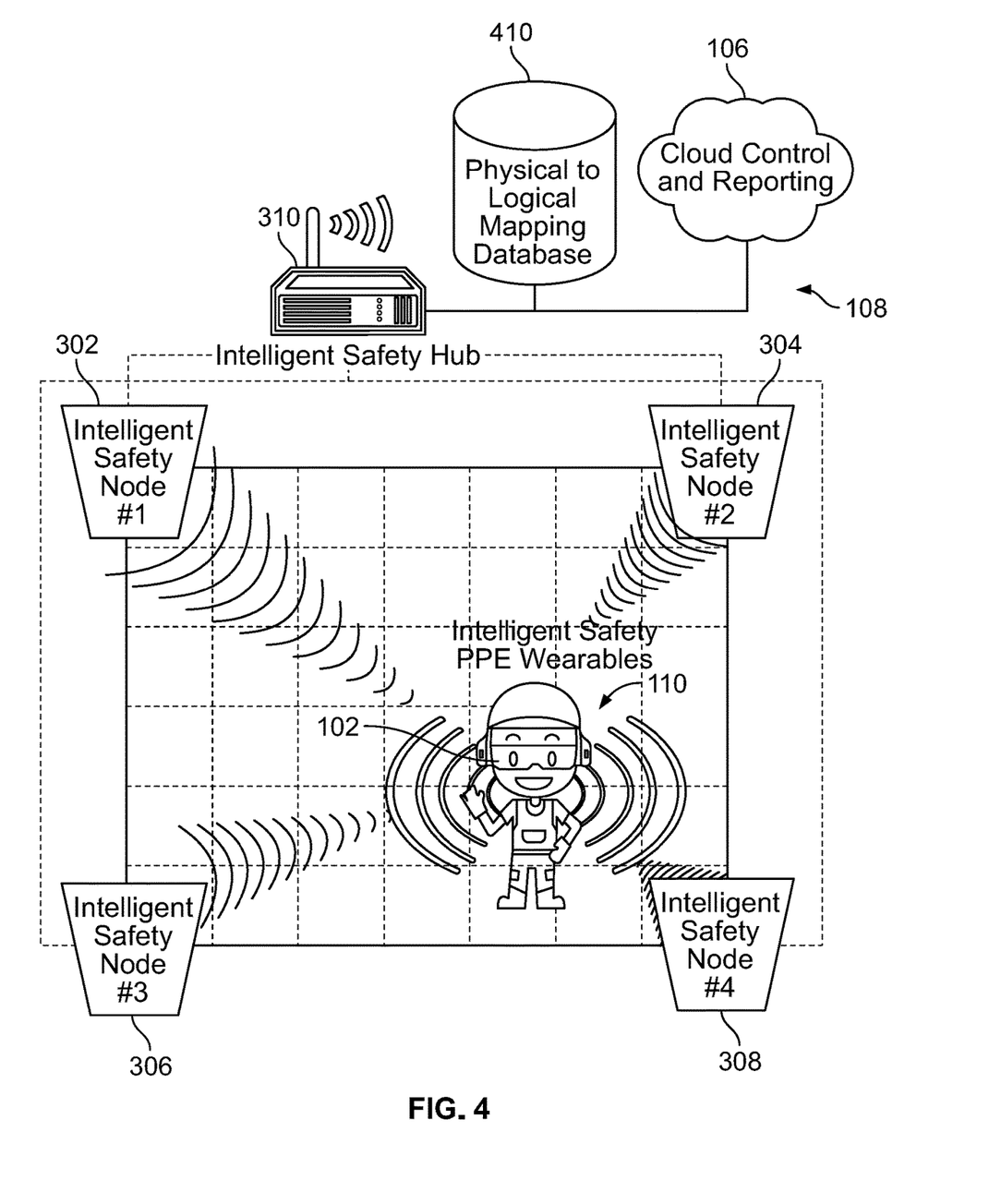
FIG. 4 illustrates example aspects of the safety system of FIG. 1.

Referring now to FIGS. 3-4, the example system 100 can include multiple types (classifications) of the safety glasses device 102 that comply with OSHA/ANSI requirements (as well as other wearables, as described above). The system 100 further can include safety signaling nodes 302, 304, 306, 308 that are distributed throughout a facility 320 for granular tracking and sensing of people and objects, such as the individual 110.

The system can further include one or more safety hubs 310 that may function autonomously or be connected to other hubs for scalability, including an Internet cloud authority with access to the central system 108 for updates, control and reporting.

Based on the modality of the operation, the safety signaling nodes 302, 304, 306, 308 can be mounted at strategic points throughout the facility 320 and will alert the individual 110 of the safety glasses device 102 through visual, audible and/or vibration alert(s). As the individual 110 moves through the facility 320, a relative proximity index will be calculated between the device(s) worn (e.g., the safety glasses device 102 and/or any of the other safety devices 104) and one or more of the safety signaling nodes 302, 304, 306, 308, which can then communicate to the one or more safety hubs 310. The safety hubs 310 are programmed to determine a relative location of the individual 110 within the facility 320, such as by conducting one or more queries of a physical to logical mapping database 410. This database 410 may be integrated into the safety hubs 310 or reside on the local or cloud network.

Emergency notifications can be sent to all persons, select groups or individuals (e.g., the individual 110) based on severity, scenario, event or other safety concerns. The safety hubs 310 also have the capability of counting, tracking and addressing all safety devices within a tracking perimeter of the hub 310 as defined by the setup procedures and the number of signaling nodes (e.g., the safety signaling nodes 302, 304, 306, 308) addressed by the hub 310.

In these examples, the safety signaling nodes 302, 304, 306, 308 can act as small addressable signal points that both radiate information as well as collect information. Bluetooth, Bluetooth Low Energy (BLE), ZigBee or other wireless technologies can be used for node technology based upon cost, signal strength and feature benefits. In a small facility, the wearable safety devices may be connected directly to the hub 310. However, for larger facilities, the greater the number of safety signaling nodes deployed at the facility, the better resolution for mapping of personnel and conveying specific information to the wearer that can be tangible by work zone and evacuation area.

The safety signaling nodes 302, 304, 306, 308 can be standalone battery powered and wireless (especially if BLE), or they can be installed at a power source and permanently wired into mains power. The safety signaling nodes 302, 304, 306, 308 may also be built into alerting devices having other functionality, such as lamps, flashers, and strobes and audible devices including speakers and sirens. One possible added benefit of these multi-purpose devices is the wire-once aspect as well as possibly sharing network information (if so wired). An example of such a device is described in U.S. Patent Application Ser. No. 62/492,452 filed on May 1, 2017, the entirety of which is hereby incorporated by reference.

Figure 5:
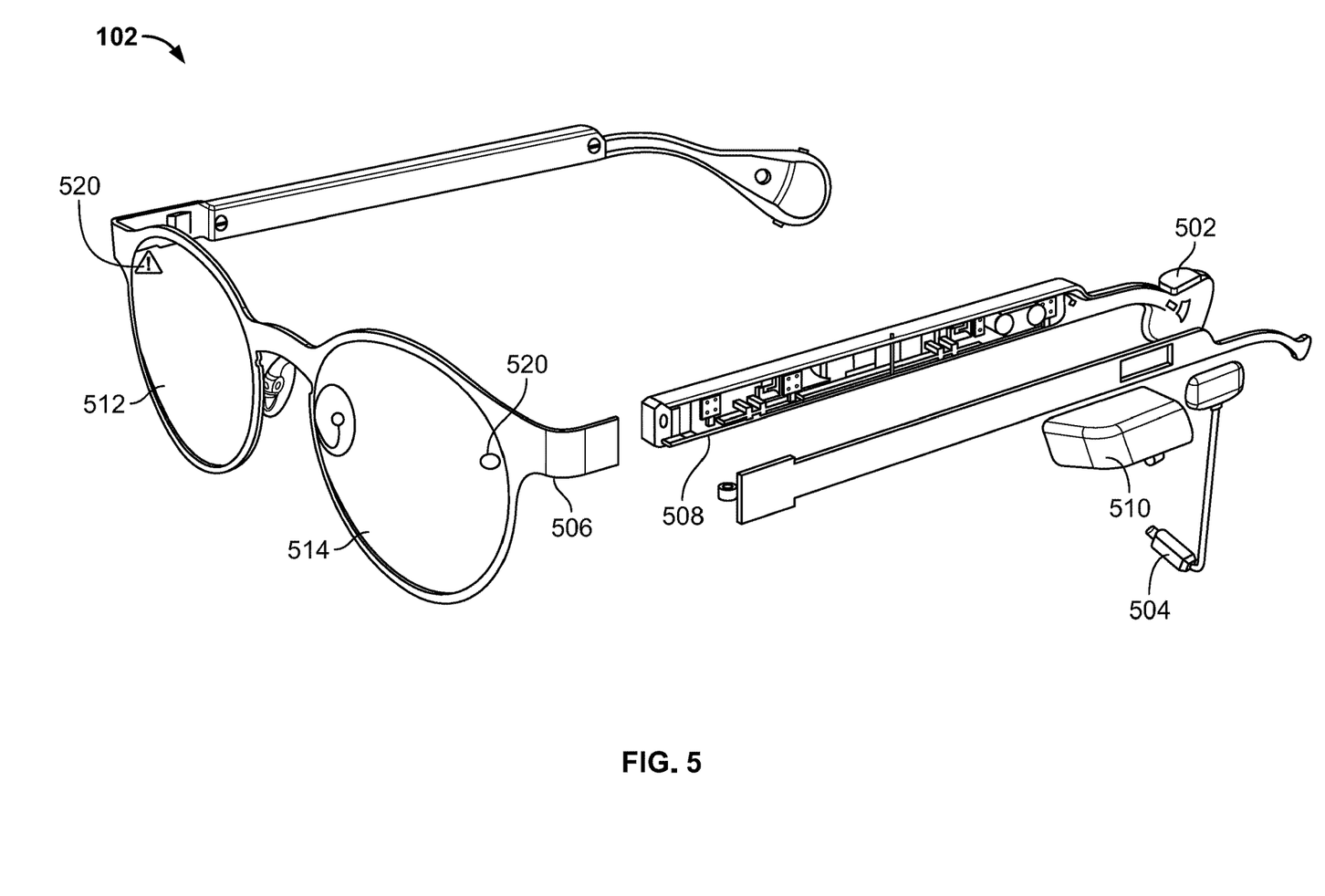
FIG. 5 illustrates an example safety glasses device of the safety system of FIG. 1.
Figure 6:
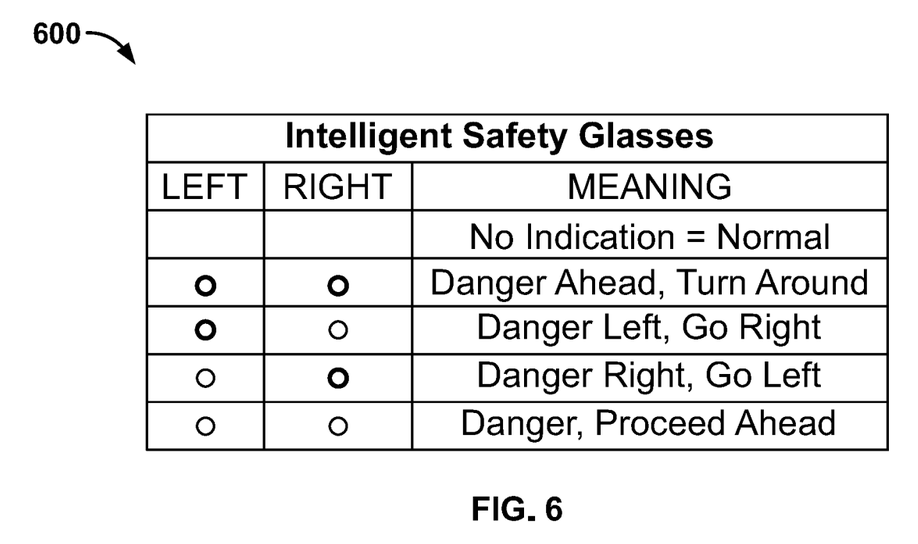
FIG. 6 illustrates an example notification scheme for the safety glasses device of FIG. 5.

Referring now to FIGS. 5-6, the safety glasses device 102 incorporate hardware and software to enable the individual 110 to be notified of emergencies or pending physical harm, or proximity based danger such as potential arc flash danger, lockout-tagout and/or collision avoidance.

In this example, the safety glasses device 102 is worn on the face of the individual 110 as regular glasses or safety glasses are worn. These safety glasses device 102 can include one or more of:

- a rechargeable battery 502 (e.g., Li-ion), such as one that can be inductively charged (i.e., no plug) or charged using traditional wiring and plug;
- a transducer 504 (e.g., piezo speaker) to vibrate and offer audible cues using an in-ear receptacle;
- a frame 506 including an antenna mounted therein;
- one or more logical components 508 including: a microprocessor for interpretation and processing of program logic; memory for storage and updating of program logic; and sensors/receivers for wireless reception (e.g., Bluetooth, Wi-Fi, ZigBee, or other means);
- volume and mode controls 510 to adjust settings including display intensity and noise cancellation;
- lenses 512, 514 (e.g., glass or polymeric); and
- LEDs 520 or other display integrated with the lenses 512, 514 or near the corners of the lenses 512, 514.

Although the safety glasses device 102 are shown, the fundamental description and purpose above could be applied to other wearables that are traditionally used as PPE or commonly worn by employees and visitors, such as those shown in FIG. 2 and described above.

Example indications provided by the safety glasses device 102 can be provided in various forms, such as visual, audible, and/or physical (e.g., vibration). FIG. 6 illustrates an example table 600 with simple indicators that can be provided by the LEDs 520 provide at the left and right lenses 512, 514 of the safety glasses device 102.

In this example, no illumination of the LEDs 520 (or illumination of a particular color, such as green) indicates a normal, non-alerting condition. Illumination of both LEDs 520 at both lenses 512, 514 (or illumination of a particular color, such as red) indicates danger in front of the individual, which alerts the individual to turn around. Illumination of just the LED 520 at the lens 512 indicates danger on the right, which tells the individual 110 to go left. Similarly, illumination of just the LED 520 at the lens 514 indicates danger on the left, which tells the individual 110 to go right.

Although simple LEDs are provided in the example, many other types of alerting can be provided. For example, icons and/or text can also be provided on the lens or lenses to provide further alert information, such as the type of alert and where to go. In some examples, audible alerts can be provided to direct the individual 110 to safety. Further, physical alerts can be provided to alert the user, particularly in bright and/or noisy environments where visual and/or audible alerts are difficult to discern.

Similar to the examples above and shown in FIG. 6, audio, vibration or haptic signals that can be used to convey directional signals (left, right, stop, turn-around) can be applied to hearing protection 104b, gloves 104c, vests 104d, footwear 104e, and wristbands 104f.

Figure 7:
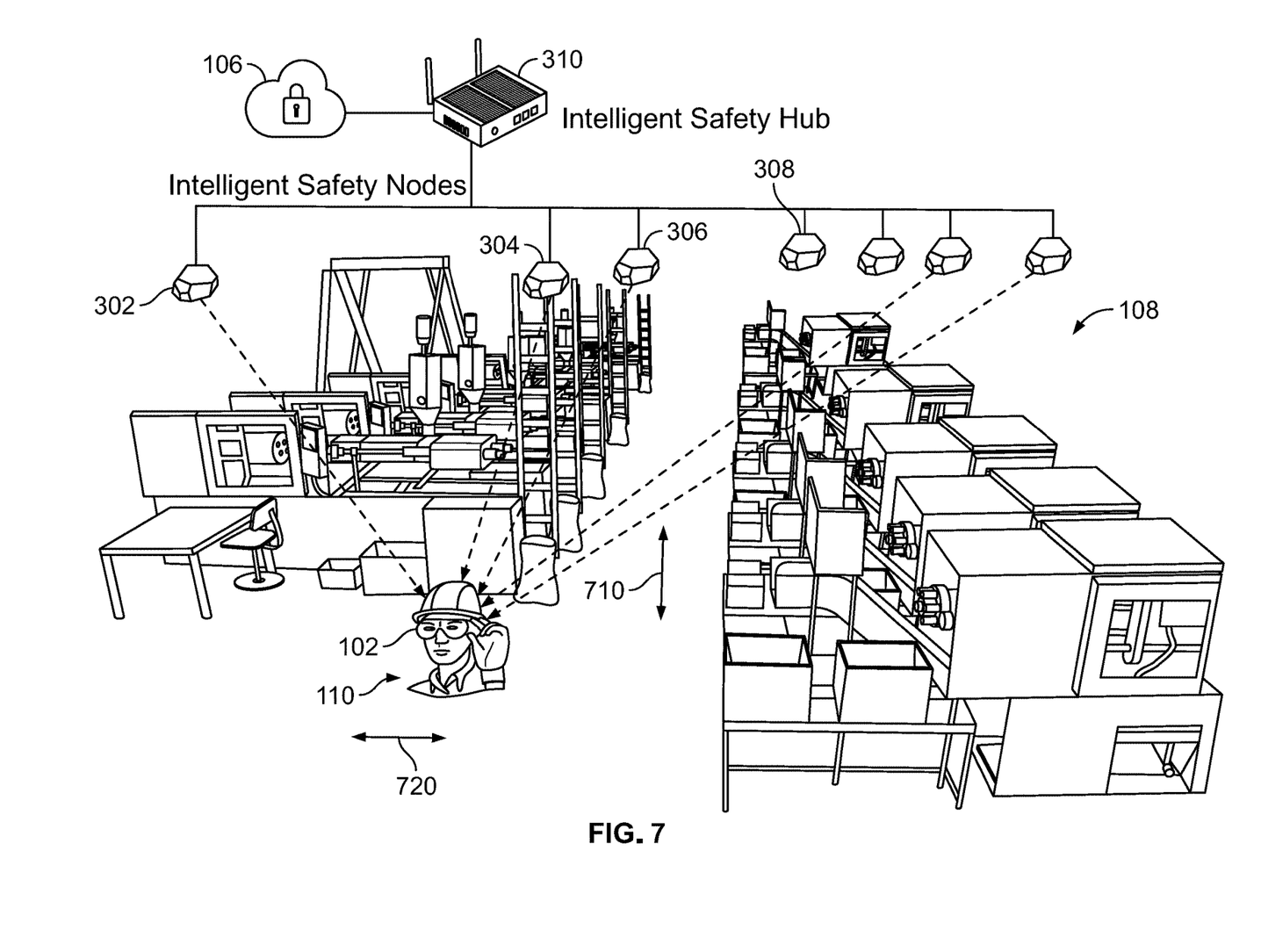
FIG. 7 illustrates a portion of the example safety system of FIG. 1.

Referring now to FIG. 7, the safety hub 310 connects all of the safety signaling nodes 302, 304, 306, 308 positioned around the facility 320 and maintains the logical to physical map of their locations. The hub 310 acts as the gateway between other alerting systems present at a location and all smart devices, such as the safety glasses device 102, to convey information and direct the individual 110 wearing the safety devices to the safest area (either shelter or evacuation point). For example, using the communication scheme of FIG. 6, the safety glasses device 102 can direct the individual 110 down the aisle 710 or the aisle 720 to safety in an emergency situation.

Multiple hubs 310 and additional nodes can be deployed to allow for greater penetration and coverage of nodes and communicate together for handoffs and tracking of movement within the facility.

Statistics that can be collected include clustering information (e.g., congregation points), traffic patterns, timelines of traffic movement of personnel, tracking of near-misses between personnel and moving vehicles. The hub 310 can be queried and function as a short-term record keeping device. However, connection to a secure cloud service for analytics, reporting and interactions with other agencies such as OSHA, insurance underwriters and service bureaus can be provided.

In addition to the safety glasses device 102 and/or the other wearable safety devices 104 communicating with the central system 108 and/or the safety hubs 310, the safety glasses device 102 and/or wearable safety devices 104 can be configured for device-to-device communication utilizing the stated wireless or cellular communications means. In this configuration, the wearable device of one individual could communicate with the wearable devices of other individuals within a given area. This peer-to-peer signaling scenario could further enhance signaling, particularly in environments that impede normal long-range wireless communications.

Figure 8:
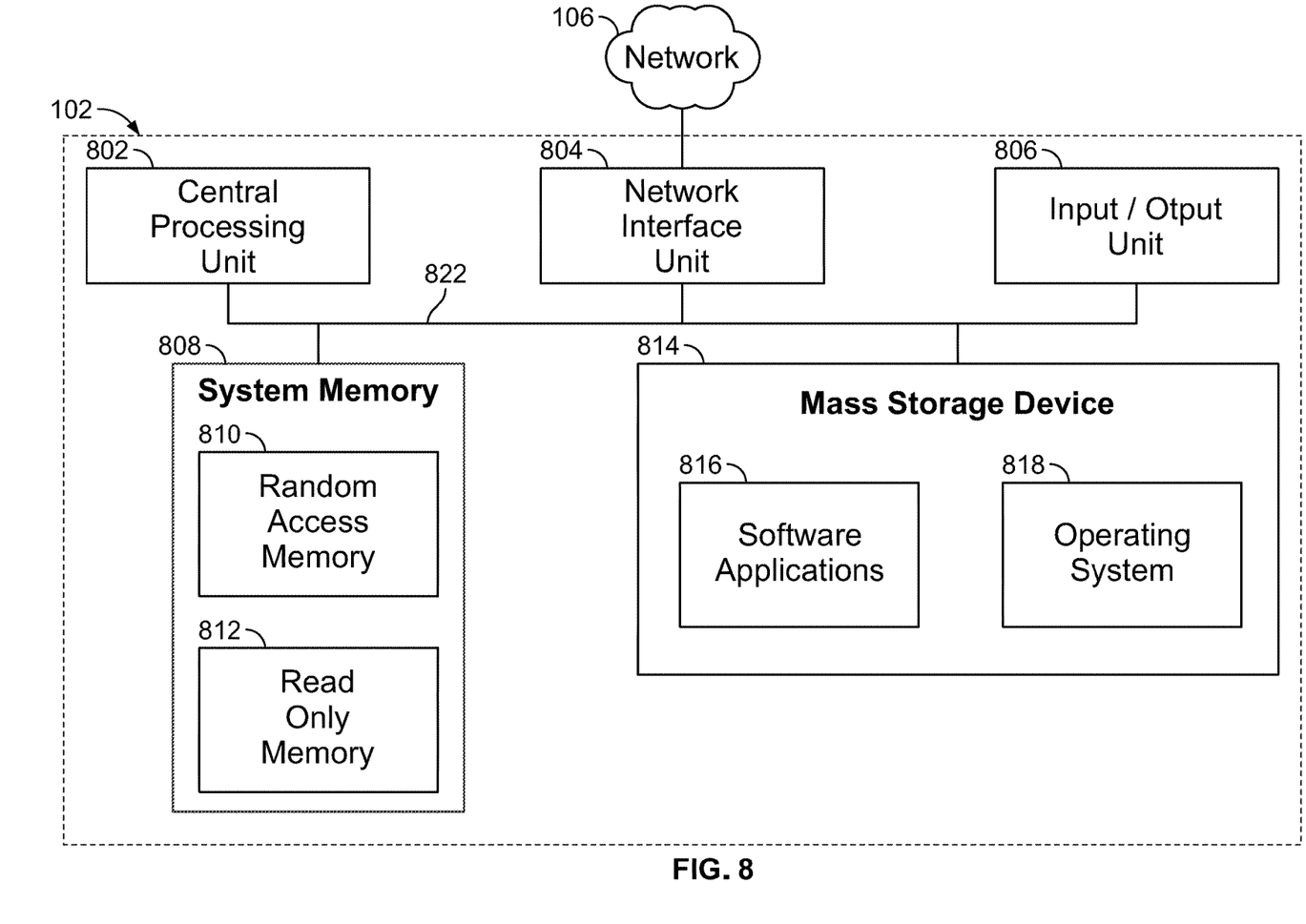
FIG. 8 illustrates example physical components of the safety glasses device of FIG. 5.

As illustrated in the example of FIG. 8, the example safety glasses device 102 includes at least one central processing unit ("CPU") 802 (or GPU or any other computational engine for processing instructions), also referred to as a processor, a system memory 808, and a system bus 822 that couples the system memory 808 to the CPU 802. The system memory 808 may include a random access memory ("RAM") 810 and/or read-only memory ("ROM") 812. A basic input/output system that contains the basic routines that help to transfer information between components within the safety glasses device 102, such as during startup, is stored in the ROM 812. The safety glasses device 102 may further include a mass storage device 814. The mass storage device 814 is able to store software instructions and data. Some or all of the components of the safety glasses device 102 can also be included in the wearable safety devices 104, the central system 108 and the other computing devices described herein.

The mass storage device 814 is connected to the CPU 802 through a mass storage controller (not shown) connected to the system bus 822. The mass storage device 814 and its associated computer-readable data storage media provide non-volatile, non-transitory storage for the safety glasses device 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the safety glasses device 102.

According to various embodiments of the invention, the safety glasses device 102 may operate in a networked environment using logical connections to remote network devices through the network 106, such as a wireless network, the Internet, or another type of network. The safety glasses device 102 and/or wearable safety devices 104 may connect to the network 106 through a network interface unit 804 connected to the system bus 822. It should be appreciated that the network interface unit 804 may also be utilized to connect to other types of networks and remote computing systems. The safety glasses device 102 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the safety glasses device 102 can store software instructions and data. The software instructions include an operating system 818 suitable for controlling the operation of the safety glasses device 102. The mass storage device 814 and/or the RAM 810 also store software instructions and software applications 816, that when executed by the CPU 802, cause the safety glasses device 102 to provide the functionality of the safety glasses device 102 discussed in this document. For example, the mass storage device 814 and/or the RAM 810 can store software instructions that, when executed by the CPU 802, cause the safety glasses device 102 to display received data on one or both of the lenses of the safety glasses device 102.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A safety system, comprising:
safety glasses configured to communicate with a central hub of a facility, and the central hub being programmed to determine a location of the safety glasses within the facility, and to provide emergency instructions to the at least one wearable device based upon the location, the safety glasses including an indicator in each of a right lens and a left lens of the safety glasses, wherein:
illumination of the indicator in the right lens indicates an alert on a right of the safety glasses;
illumination of the indicator in the left lens indicates an alert on a left of the safety glasses; and
illumination of the indicators in both the right and the left lenses indicates an alert in front of the safety glasses.

2. A wearable safety device, comprising:
safety glasses, the safety glasses including:
 a frame
 a right lens and a left lens, each of the right and the left lenses including a light to indicate an alert situation; and
 one or more logical components programmed to communicate with a central hub of a facility,
wherein the central hub determines a location of the safety glasses within the facility and provides emergency instructions to the safety glasses based upon the location;
wherein each of the lights is illuminated to indicate the emergency instructions;
wherein illumination of the light of the right lens indicates an alert on a right of the safety glasses;
wherein illumination of the light of the left lens indicates an alert on a left of the safety glasses; and
wherein illumination of the lights of both the right and the left lenses indicates an alert in front of the safety glasses.

3. A pair of safety glasses for a safety system, comprising:
a frame;
a right lens and a left lens; and
one or more logical components programmed to communicate with a central hub of a facility;
wherein the central hub determines a location of the safety glasses within the facility and provides emergency instructions to the safety glasses based upon the location;
wherein each of the right and the left lenses includes an indicator; and
wherein:
 illumination of the indicator on the right lens indicates an alert on a right of the safety glasses;
 illumination of the indicator on a left lens indicates an alert on a left of the safety glasses; and
 illumination of both of the indicators indicates an alert in front of the safety glasses.

\* \* \* \* \*

UNITED STATES PATENT AND TRADEMARK OFFICE
CERTIFICATE OF CORRECTION

PATENT NO. : 10,607,474 B2
APPLICATION NO. : 16/261712
DATED : March 31, 2020
INVENTOR(S) : Strebel et al.

Page 1 of 1

It is certified that error appears in the above-identified patent and that said Letters Patent is hereby corrected as shown below:

In the Claims

Column 6, Line 66: In Claim 1, delete "and"

Signed and Sealed this
Eighth Day of December, 2020

Andrei Iancu
*Director of the United States Patent and Trademark Office*